(12) United States Patent
Yeandel

(10) Patent No.: US 11,466,856 B2
(45) Date of Patent: Oct. 11, 2022

(54) AFTERBURNER STRUT WITH INTEGRATED FUEL FEED LINES

(71) Applicant: ROLLS-ROYCE plc, London (GB)

(72) Inventor: Michael Yeandel, Bristol (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/317,073

(22) Filed: May 11, 2021

(65) Prior Publication Data

US 2021/0356127 A1    Nov. 18, 2021

(30) Foreign Application Priority Data

May 12, 2020 (GB) ...................................... 2006964

(51) Int. Cl.
*F23R 3/20* (2006.01)
*F02K 3/10* (2006.01)
*F23R 3/28* (2006.01)
*F02K 3/11* (2006.01)

(52) U.S. Cl.
CPC .................. *F23R 3/20* (2013.01); *F02K 3/10* (2013.01); *F02K 3/11* (2013.01); *F23R 3/283* (2013.01); *F05D 2220/32* (2013.01); *F05D 2240/35* (2013.01)

(58) Field of Classification Search
CPC ... F02K 3/10; F02K 3/11; F02K 3/105; F23R 3/18; F23R 3/20; F23R 3/283
See application file for complete search history.

(56) References Cited

U.S. PATENT DOCUMENTS

| | | | |
|---|---|---|---|
| 2,711,070 A * | 6/1955 | Henning | F23R 3/20 60/749 |
| 2,929,203 A | 3/1960 | Henning, Jr. et al. | |
| 3,029,603 A * | 4/1962 | Brown | F23R 3/20 60/767 |
| 3,893,297 A | 7/1975 | Tatem, Jr. et al. | |
| 3,999,378 A | 12/1976 | Tatem, Jr. et al. | |
| 5,012,638 A | 5/1991 | Grieb et al. | |
| 5,335,490 A | 8/1994 | Johnson et al. | |
| 5,385,015 A * | 1/1995 | Clements | F23R 3/20 60/765 |
| 5,390,498 A | 2/1995 | Sulkin | |

(Continued)

FOREIGN PATENT DOCUMENTS

| | | |
|---|---|---|
| EP | 1229290 A2 | 8/2002 |
| GB | 830030 A | 3/1960 |
| JP | H09268947 A | 10/1997 |

OTHER PUBLICATIONS

European search report dated Sep. 30, 2021, issued in EP Patent Application No. 21169299.

(Continued)

*Primary Examiner* — Alain Chau
(74) *Attorney, Agent, or Firm* — Barnes & Thornburg LLP

(57) ABSTRACT

An afterburner arrangement comprising: an internal casing and an external casing defining a bypass pathway between them; a mounting strut forming a structural connection between the internal casing and the external casing; and A plurality of fuel nozzles associated with the mounting strut, wherein the mounting strut at least partly houses a corresponding plurality of fuel pathways to provide fuel to the respective fuel nozzles.

12 Claims, 11 Drawing Sheets

(56) References Cited

U.S. PATENT DOCUMENTS

| | | | | |
|---|---|---|---|---|
| 5,396,763 A * | 3/1995 | Mayer | ............... | F23R 3/20 60/749 |
| 6,415,609 B1 * | 7/2002 | Vacek | ............... | F02K 3/11 60/761 |
| 6,463,739 B1 * | 10/2002 | Mueller | ............ | F23R 3/283 60/765 |
| 7,287,383 B2 * | 10/2007 | Bunel | ............... | F23R 3/20 60/765 |
| 7,370,477 B2 * | 5/2008 | Roche | ............... | F23R 3/283 60/761 |
| 7,437,876 B2 * | 10/2008 | Koshoffer | ......... | F23R 3/20 60/764 |
| 7,506,513 B2 * | 3/2009 | Roche | ............... | F02K 3/11 60/761 |
| 7,584,615 B2 * | 9/2009 | Baboeuf | ........... | F02K 3/10 60/761 |
| 7,908,868 B2 * | 3/2011 | Bunel | ............... | F02K 3/10 60/761 |
| 9,879,862 B2 * | 1/2018 | McCormick | ....... | F23R 3/20 |
| 10,436,117 B2 * | 10/2019 | Lovett | .............. | F23R 3/20 |
| 2003/0019205 A1 * | 1/2003 | Rice | ................ | F23R 3/28 60/761 |
| 2005/0086941 A1 * | 4/2005 | Bunel | ............... | F23R 3/20 60/761 |
| 2005/0252216 A1 * | 11/2005 | Roche | ............... | F02K 3/11 60/765 |
| 2005/0257527 A1 * | 11/2005 | Baboeuf | ........... | F02K 1/386 60/722 |
| 2006/0016194 A1 * | 1/2006 | Roche | ............... | F23R 3/283 60/765 |
| 2006/0213180 A1 * | 9/2006 | Koshoffer | ......... | F23R 3/20 60/761 |
| 2007/0227152 A1 * | 10/2007 | Bunel | ............... | F02K 3/10 60/761 |
| 2010/0218505 A1 * | 9/2010 | Lains | ............... | F02C 7/266 60/765 |
| 2011/0067407 A1 * | 3/2011 | Berdou | .............. | F02K 3/10 60/765 |
| 2015/0121886 A1 | 5/2015 | Mccormick et al. | | |
| 2015/0285148 A1 * | 10/2015 | Lovett | .............. | F02C 7/22 60/734 |

OTHER PUBLICATIONS

Great Britain search report dated Sep. 1, 2020, issued in GB Patent Application No. 2006964.7.

* cited by examiner

AFTERBURNER STRUT WITH INTEGRATED FUEL FEED LINES

CROSS REFERENCE TO RELATED APPLICATIONS

This application claims the benefit of UK Patent Application No. GB 2006964.7, filed on 12 May 2020, which is hereby incorporated herein in its entirety.

BACKGROUND

Technical Field

The present disclosure relates to an afterburner arrangement, a gas turbine engine comprising an afterburner arrangement, and a method of assembling an afterburner arrangement.

Description of the Related Art

Afterburners are a known means of providing a large and rapid increase in the amount of thrust produced by a gas turbine engine. Due to their relative fuel inefficiency compared to normal operation of the gas turbine engine, they are usually used in circumstances where a short-term increase in thrust is required to achieve a particular objective (e.g. launch of an aircraft from a short runway, catapult-assisted launch of an aircraft from the deck of an aircraft carrier, evasive manoeuvring of an aircraft during combat, etc.).

SUMMARY

In accordance with a first aspect of the disclosure there is provided an afterburner arrangement comprising:

an internal casing and an external casing defining a bypass pathway between them;

a mounting strut forming a structural connection between the internal casing and the external casing; and a plurality of fuel nozzles associated with the mounting strut, wherein the mounting strut at least partly houses a corresponding plurality of fuel pathways to provide fuel to the respective fuel nozzles.

The mounting strut provides a mechanical connection between the internal and external casings, restricting movement of the internal casing relative to the external casing in upstream and downstream directions of the bypass pathway, while performing the additional function of partly housing a fuel pathway for the fuel nozzle. In previously considered arrangements the fuel supply to the nozzle was carried out by a separate feed line affixed to the internal or external casing. The present disclosure therefore enables the construction of an afterburner arrangement with fewer components than was previously achievable.

In some examples, each and every mounting strut between the internal casing and the external casing is associated with at least one fuel nozzle and at least partly houses a fuel pathway to provide fuel to the fuel nozzle.

In some examples, a fuel pathway of the plurality extends through the internal casing to a respective fuel nozzle configured to discharge fuel radially inward of the internal casing. Previously, nozzles projecting through an opening in the fuel casing were supplied with fuel via a manifold located within the bypass pathway. Locating a manifold in this position obstructs airflow through the bypass path, which can cause undesirable pressure variations within the bypass pathway. The present disclosure removes the need for a manifold within the bypass pathway by supplying fuel through the mounting strut.

In some examples, a fuel nozzle of the plurality is fixedly attached to the mounting strut. In previously considered afterburner arrangements nozzles are either attached to the internal or external casing, or are attached to a fuel feed line which is attached to the internal or external casing. The present disclosure allows the mounting strut to provide a further function of directly supporting a fuel nozzle configured to spray fuel into the bypass pathway.

In some examples, a fuel nozzle of the plurality is attached to the internal casing at a location spaced apart from a structural attachment point between the mounting strut and the internal casing, and the afterburner arrangement further comprises a fuel feed line at least partly defining the fuel pathway and extending between the mounting strut and the respective fuel nozzle (i.e. the fuel nozzle associated with the respective fuel pathway). Previously, nozzles attached to the internal casing were supplied with fuel by a fuel line extending through the external casing. The present disclosure provides an afterburner arrangement with fewer holes cut in the external casing, as the fuel feed line utilises a hole which is already present to house the mounting strut.

In some examples, the fuel feed line is fixedly attached to the mounting strut.

In some examples, the mounting strut is fixedly attached to the internal casing. This can be through the use of removable fasteners, or it can be a permanent attachment (e.g. a welded connection).

In some examples, the external casing comprises an inner surface exposed to the bypass pathway and an outer surface opposed to the inner surface, and the mounting strut passes through a hole in the external casing from the inner surface to the outer surface. The present disclosure enables a novel build order for the afterburner components. Previously, the mounting strut and feed lines for the fuel nozzles were all attached from the external surface of the outer casing.

In some examples, the mounting strut and the hole in the external casing are configured so that the mounting strut can only be received in the hole from an inner side of the external casing. In other words, a radially inner portion of the mounting strut is configured so that it cannot pass through the hole in the external casing. This enables the strut to move up and down within the hole, which in turn enables the absorption of vibrations of the internal and external casings which are experienced during operation of the afterburner arrangement due to rapid airflow through the bypass pathway. The sliding up/down movement also allows the arrangement to accommodate relative movement between the internal casing and the external casing due to thermal expansion. In operation, the external casing remains relatively cold while the internal casing becomes relatively hot.

In some examples, the bypass pathway has a first, upstream end and a second, downstream end opposite the upstream end, and a portion of the mounting strut which at least partly houses the fuel pathway extends upstream or downstream of the hole in the external casing such that the portion of the mounting strut has a cross-section larger than a cross-section of the hole in the external casing. This is enabled by the novel build method in which the mounting strut is inserted into a hole in the external casing from within the bypass pathway. Previously, the upstream and downstream extent of the mounting strut was limited by the size of the hole.

In some examples, a fuel pathway of the plurality is configured to convey fuel from an external side of the external casing, through a portion of the mounting strut and out of the mounting strut within the bypass pathway. This allows fuel to be provided from a fuel source on an outer surface of the external casing to a fuel nozzle within the bypass pathway or attached to the internal casing, without creating an additional hole in the external casing to house a fuel feed line.

The respective pluralities of fuel pathways and fuel nozzles may comprise at least:
a fuel pathway extending through the internal casing to an associated fuel nozzle configured to discharge fuel radially inward of the internal casing; and a fuel pathway extending to a fuel nozzle fixedly attached to the mounting strut and configured to discharge fuel into the bypass pathway.

In some examples, the mounting strut comprises a distribution block, wherein there are at least two fuel pathways each comprising a borehole in the distribution block. The provision of a distribution block as the mounting strut enables the fuel pathways to be simply drilled into the block, which is a quick and cost-effective method of fabrication.

In some examples, the mounting strut is one of a plurality of mounting struts circumferentially distributed around the afterburner arrangement, each having one or more associated fuel nozzles and fuel pathways at least partly housed in the respective strut.

In some examples, the afterburner arrangement further comprises a manifold configured to provide fuel to at least some of the fuel pathways associated with different mounting struts, wherein the manifold is disposed radially outside of the bypass pathway and each one of the respective fuel pathways is configured to convey the fuel through a wall of the external casing defining the bypass pathway. In some previously considered arrangements, manifolds were placed within the bypass pathway (e.g. to supply nozzles projecting through an opening in the internal casing). The present disclosure enables all manifolds to be located on an external side of the external casing, which reduces the number of obstructions within the bypass pathway.

In accordance with a second aspect of the disclosure there is provided a gas turbine engine comprising an afterburner arrangement according to the first aspect.

In accordance with a third aspect of the disclosure there is provided a method of assembling an afterburner arrangement, the method comprising:
providing an external casing defining an outer surface of a bypass pathway, the external casing having a mounting hole;
inserting a mounting strut into the mounting hole from an inner side of the external casing, said mounting strut at least partly housing a fuel pathway to provide fuel to a fuel nozzle;
subsequently receiving an internal casing defining an inner surface of the bypass pathway radially within the external casing to align a mounting point of the internal casing with a corresponding mounting point of the mounting strut; and
attaching the mounting point of the mounting strut to the mounting point of the internal casing.

In accordance with a fourth aspect there is provided an afterburner arrangement which differs from afterburner arrangements in accordance with the first aspect above by having a fuel nozzle associated with the mounting strut (as opposed to a plurality of such fuel nozzles), and a corresponding fuel pathway at least partly housed in the mounting strut (as opposed to a plurality of such fuel pathways).

Advantages of such an arrangement include that the fuel nozzle may be spaced apart from a structural attachment point between the mounting strut and the internal casing, without necessitating a fuel pathway entirely separate from the mounting strut that requires passage through and/or mounting in the external casing separate from the mounting strut.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
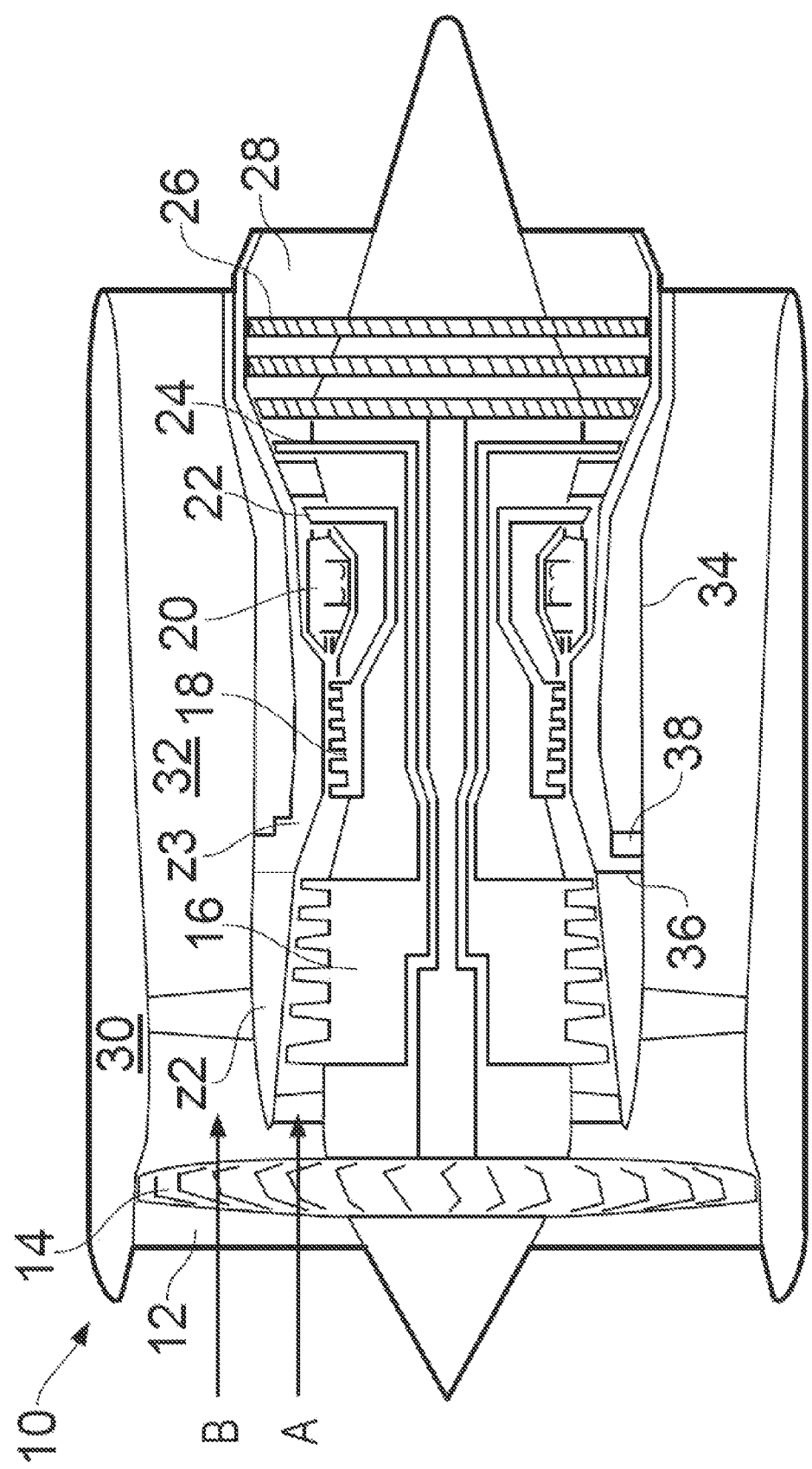
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high-pressure compressor 18, a combustor 20, a high-pressure turbine 22, an intermediate pressure turbine 24, a low pressure turbine 26 and an exhaust nozzle 28. An external casing 30 surrounds the gas turbine engine 10 and defines, in axial flow B, a bypass 32. The radially inner extent of the bypass 32 is defined by an annular internal casing 34. The internal casing 34 defines at least two exemplary fire zones, zone z2 and zone z3, that are axially separated by a barrier wall 36. Downstream of the barrier wall 36 there is an array of ventilation inlets 38 that are equi-angularly spaced around at least a portion of the circumference of the annular inner wall 34 to permit air to flow from the bypass 32 into fire zone z3 to ventilate and purge it.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
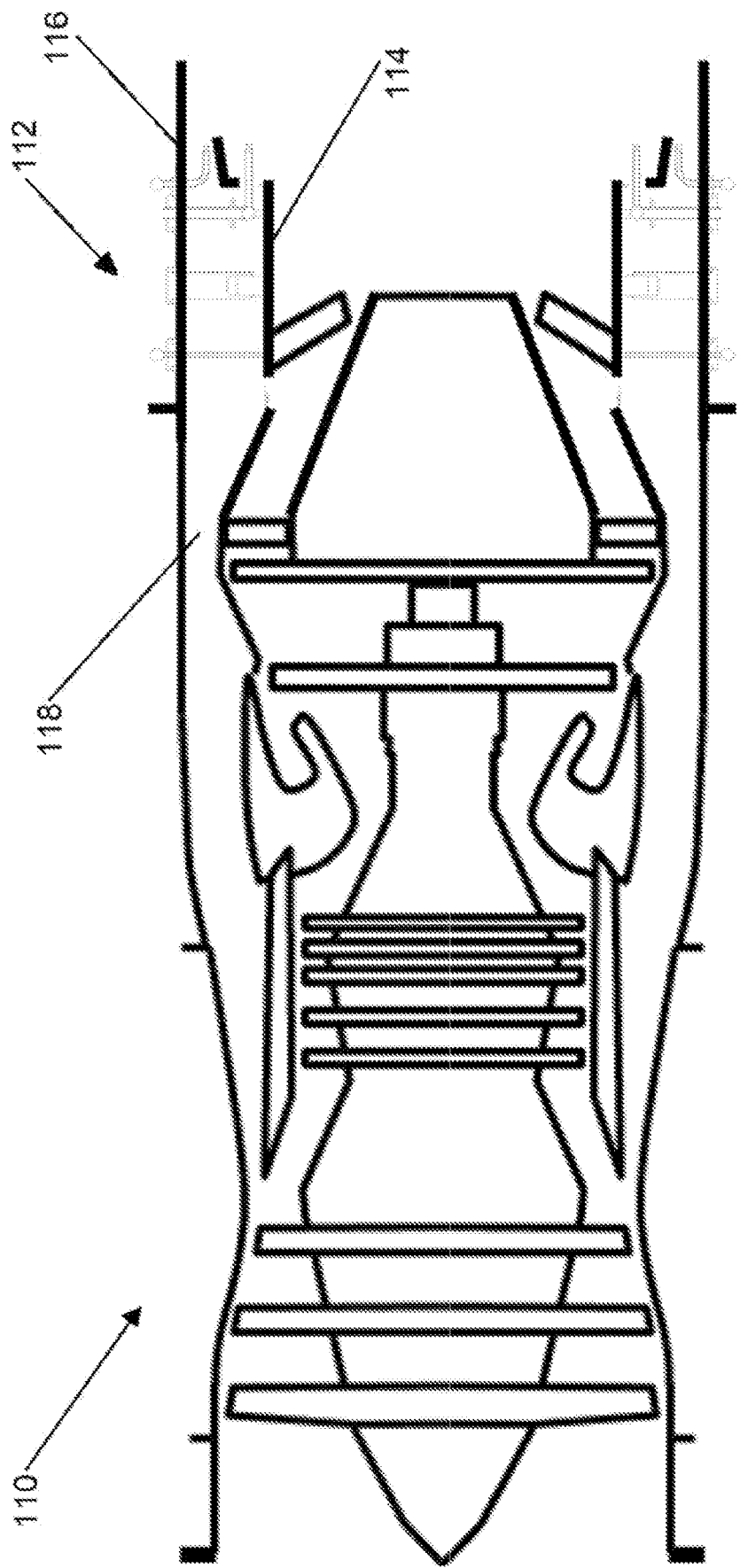
FIG. 2 schematically shows a side cross-sectional view of a gas turbine engine including a previously considered afterburner arrangement.

FIG. 2 schematically shows a side cross-sectional view of a gas turbine engine 110 including a previously considered afterburner arrangement 112. The afterburner arrangement 112 comprises an internal casing 114 radially within an external casing 116, which define a bypass pathway 118 between them. Further components of the afterburner arrangement 112 are located within the bypass pathway 118, and these can be seen in more detail in FIG. 4.

Figure 3:
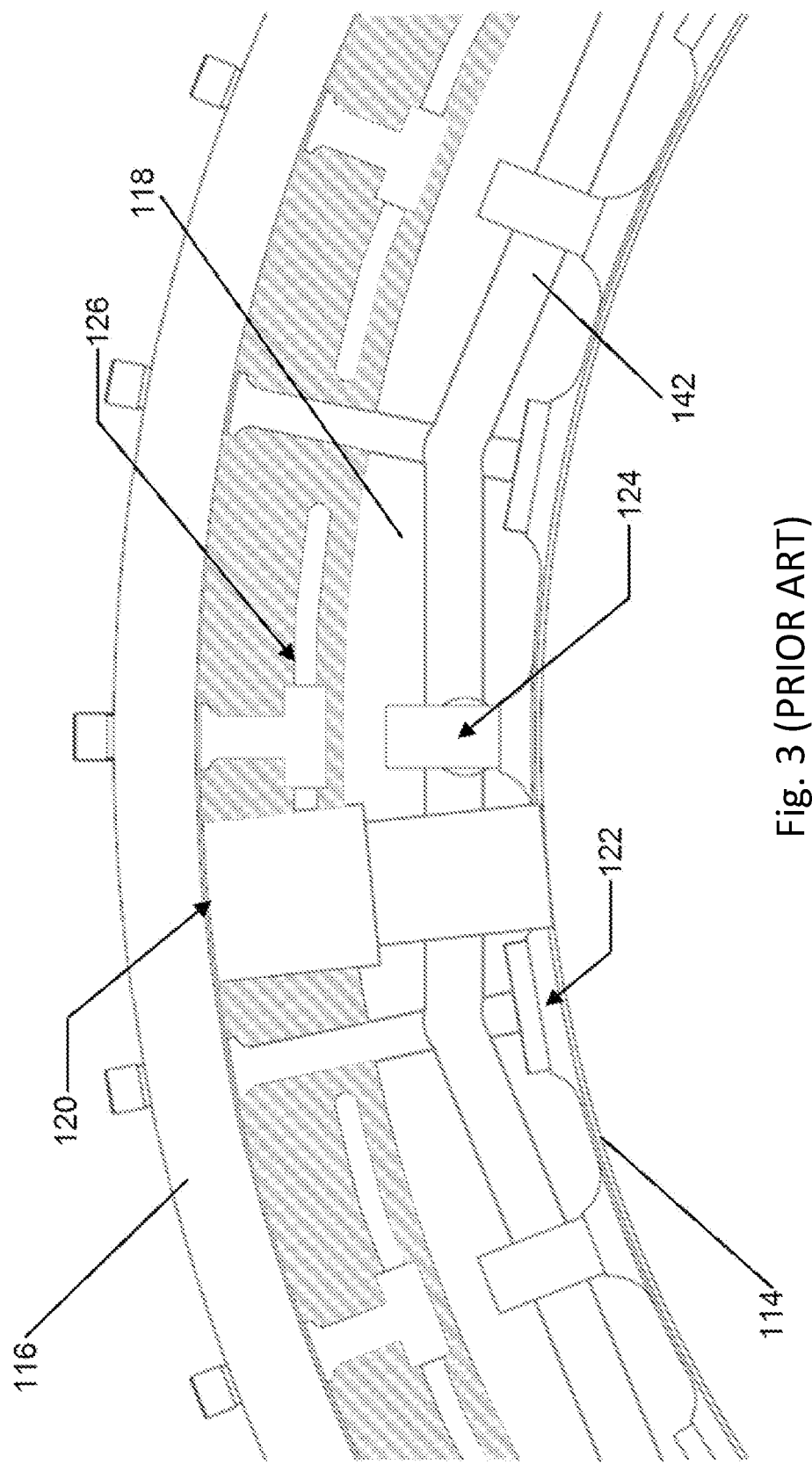
FIG. 3 schematically shows a cross-sectional view (normal to engine centreline) of a portion of the previously considered afterburner arrangement shown in FIG. 2.

FIG. 3 schematically shows a cross-sectional view of a portion of the previously considered afterburner arrangement shown in FIG. 2, and like reference numerals are retained as appropriate. The cross-sectional view is in a plane normal to the engine centreline. In this view it can be seen that a mounting strut 120 extends from the internal casing 114 to the external casing 116, forming a structural connection therebetween. Also visible in this view are a first fuel nozzle 122, a second fuel nozzle 124 and a third fuel nozzle 126. The first fuel nozzle 122 is configured to spray fuel into a volume adjacent of the internal casing. The second fuel nozzle 124 and the third fuel nozzle 126 are configured to spray fuel into a volume rearward of the internal casing 114. The first, second and third nozzles receive fuel from respective fuel feed lines, as will be described in more detail with reference to FIG. 4. While only a limited angular portion of the afterburner arrangement is shown in FIG. 3, the same configuration of fuel nozzles is replicated at various circumferential locations around the annulus between the internal casing 114 and the external casing 116.

The shaded area in FIG. 3 represents the cross-sectional area through which substantially undisturbed air flow may pass through the bypass pathway 118—i.e. airflow which is relatively unobstructed by obstacles in the bypass pathway. It is desirable to maximize the cross-sectional area for undisturbed air flow. Obstructions in the bypass pathway 118 that obstruct air flow may cause pressure loss within the bypass pathway 118 that may reduce the efficiency of the operation of the gas turbine engine 110, or may generate an undesirable flow behaviour. It can be seen in FIG. 3 that the mounting strut 120 represents an obstruction in the bypass pathway 118. A manifold 142 surrounds the internal casing 114. The manifold 142 distributes fuel to the plurality of second fuel nozzles 124 arranged around the internal casing 114. The manifold 142 presents an obstruction in the bypass pathway 118.

Figure 4:
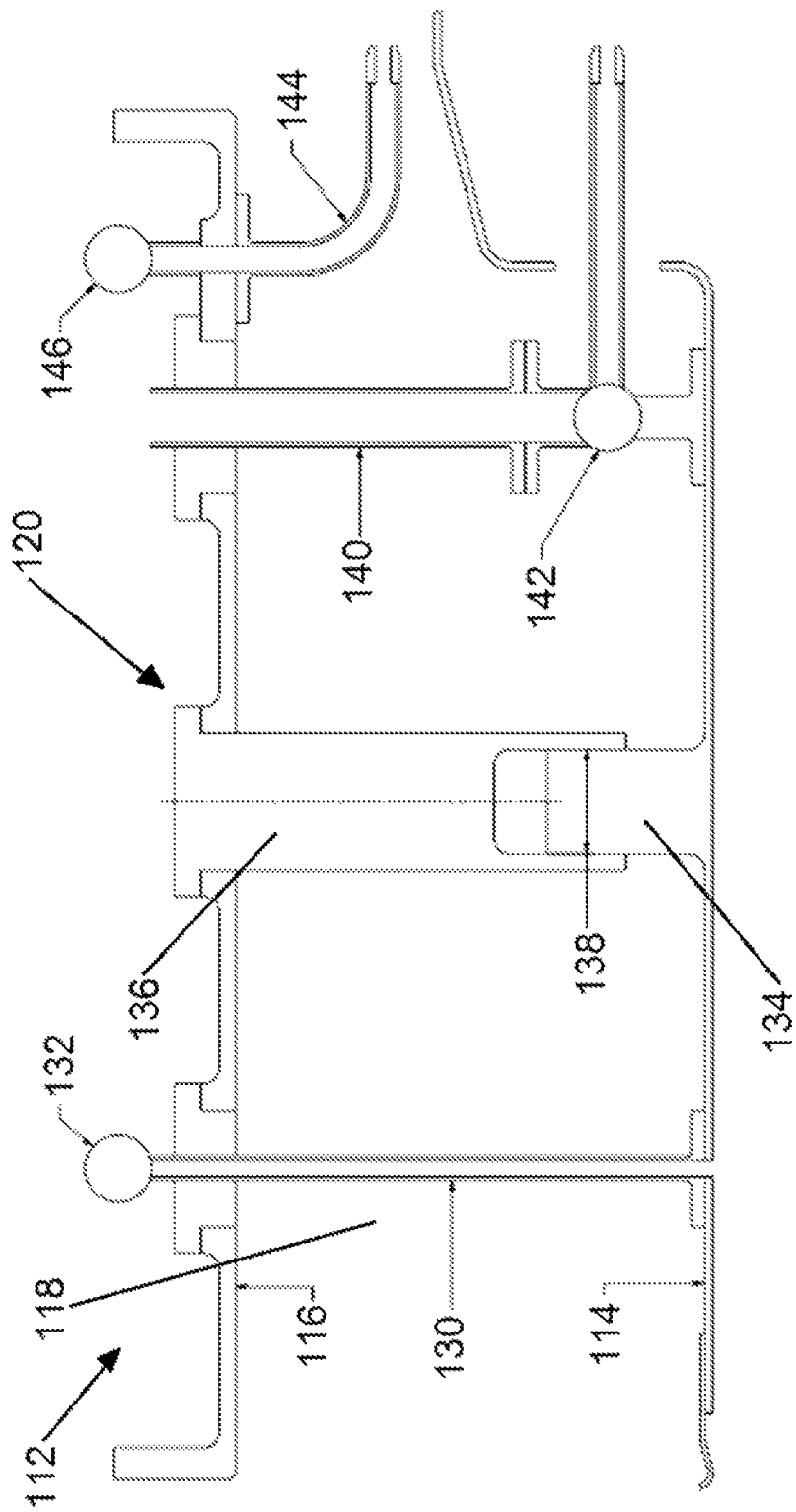
FIG. 4 schematically shows a detailed side cross-sectional view of the previously considered afterburner arrangement shown in FIG. 2.

FIG. 4 schematically shows a detailed side cross-sectional view of the previously considered afterburner arrangement 112 shown in FIG. 2, and like reference numerals are retained as appropriate.

The afterburner arrangement 112 comprises a first fuel feed line 130. The first fuel feed line 130 extends from a first end on an outer surface of the external casing 116 (i.e. on the side of the external casing 116 opposite to the bypass pathway 118), through a flanged connector in the external casing 116, to a second end comprising a flanged connection with the internal casing 114. The first fuel feed line 130 is configured to receive fuel at its first end from a first manifold 132 that extends circumferentially about an outer surface of the external casing 116. The second end of the first fuel feed line 130 is aligned with a hole in the internal casing 114, and the first fuel feed line 130 is configured to supply fuel to a first fuel nozzle through this hole. The first fuel feed line 130 does not form a structural connection between the internal casing and the external casing.

As shown in FIG. 4, the mounting strut 120 comprises a mount 134 on the internal casing 114, and a strut 136 fixedly attached to and extending from the external casing 116 towards the mount 134. The mount 134 is received in an opening of the strut 136. The strut 136 is fixed to the external casing 116 through a flanged connector. The mount 134 and the strut 136 interact at a sliding interface 138. The interface 138 prevents movement of the mount 134 with respect to the strut 136 in the upstream and downstream directions of the bypass pathway 118, which in turn prevents relative movement of the internal casing 114 with respect to the external casing 116 in the upstream and downstream directions of the bypass pathway 118. However, the interface 138 permits relative movement of the mount 134 towards and away from the strut 136 (i.e. radially, in this example), which in turns permits relative movement of the internal casing 114 towards and away from the external casing 116. During operation of the afterburner arrangement 112, pressure variations in the bypass pathway and differential thermal expansion of components may cause the internal casing 114 to move towards and away from the external casing 116. If these movements are not absorbed by the mounting strut 120 they can cause premature wear or structural damage to components of the afterburner arrangement 112.

The afterburner arrangement 112 further comprises a second fuel feed line 140. The second fuel feed line 140 extends from a first end outside the external casing 116 through a flanged connector in the external casing 116, to a second end comprising a flanged connection with the internal casing 114. The second fuel feed line 140 is configured to receive fuel at its first end and to supply fuel at its second end to a second manifold 142 that extends circumferentially about a radially-outer surface of the internal casing 114 (i.e. the surface of the internal casing 114 that is exposed to the bypass pathway 118, or the "gas-washed" surface). The second end of the second fuel feed line 40 is also configured to supply fuel to the second fuel nozzle 124. The second fuel feed line 140 does not form a structural connection between the internal casing and the external casing.

The afterburner arrangement further comprises a third fuel feed line 144. The third fuel feed line 144 extends from a first end outside the external casing 16, through a flanged connector in the external casing 116, to a second end comprising the third fuel nozzle 126. The third fuel feed line 144 is configured to receive fuel at its first end from a third manifold 146 that extends circumferentially about an outer surface of the external casing 116. Fuel is discharged from the third fuel nozzle 126 into the bypass pathway 118.

While the mounting strut 120 is configured to absorb relative movement of the internal casing 114 with respect to the external casing 116 as may occur in use in a gas turbine engine, the first and second fuel feed lines 130, 140 are not configured to absorb such relative movement. In particular, the internal casing 124 heats up during use, and expands both radially outward and axially outward (upstream and downstream) from the mounting strut 120, while the relatively cold external casing 116 does not expand to the same extent. This may cause the feed lines 130, 140 to bend, leading to potential failure of the feed lines.

The present disclosure aims to provide an improved afterburner arrangement.

Figure 5:
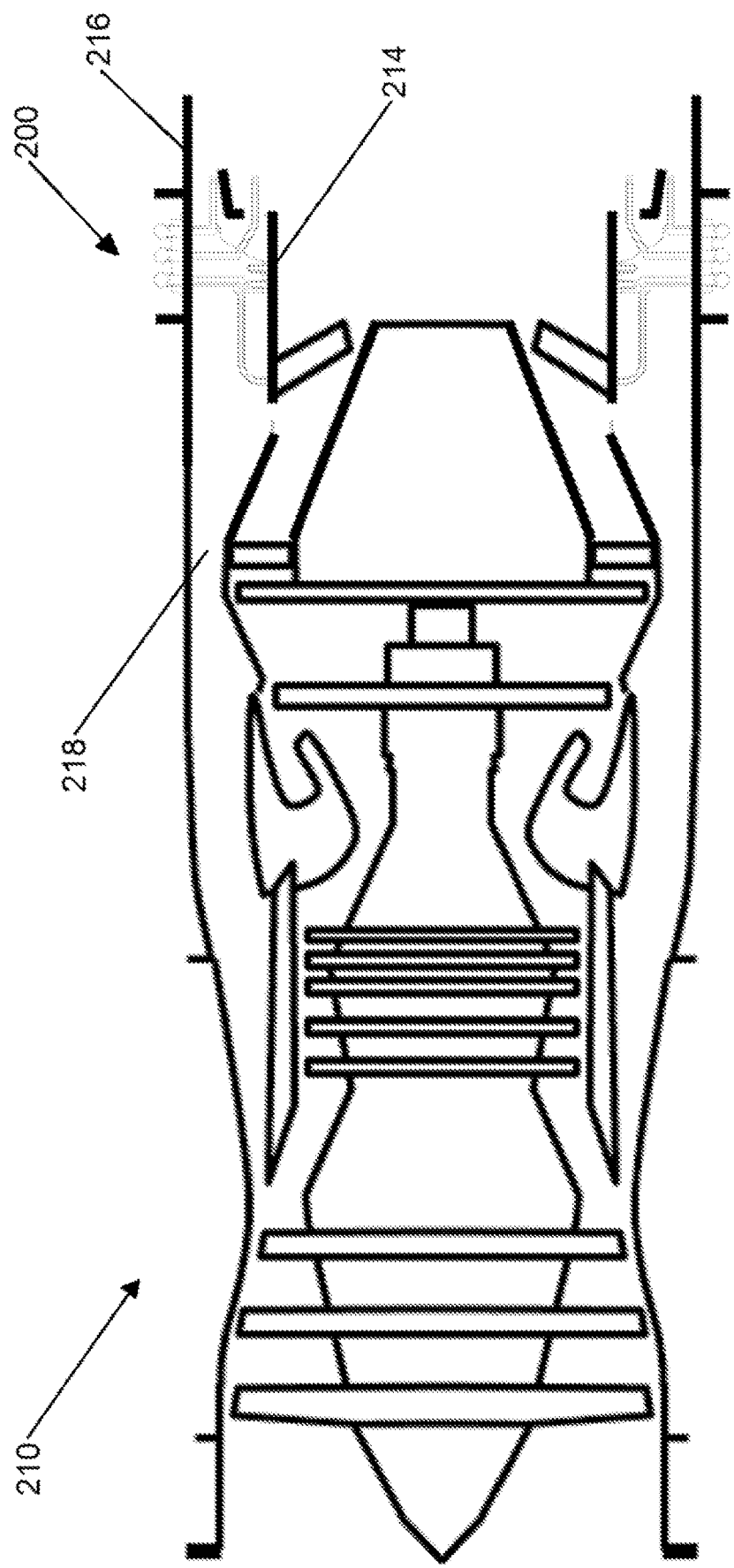
FIG. 5 schematically shows a side cross-sectional view of a gas turbine engine incorporating an afterburner arrangement according to an embodiment of the disclosure.

FIG. 5 schematically shows a side cross-sectional view of a gas turbine engine 210 incorporating an afterburner arrangement 200 according to an embodiment of the disclosure. As in the above described afterburner arrangement of FIG. 2, the afterburner arrangement 200 comprises an inner casing 214 and an outer casing 216 defining a bypass pathway 218 therebetween.

Figure 6:
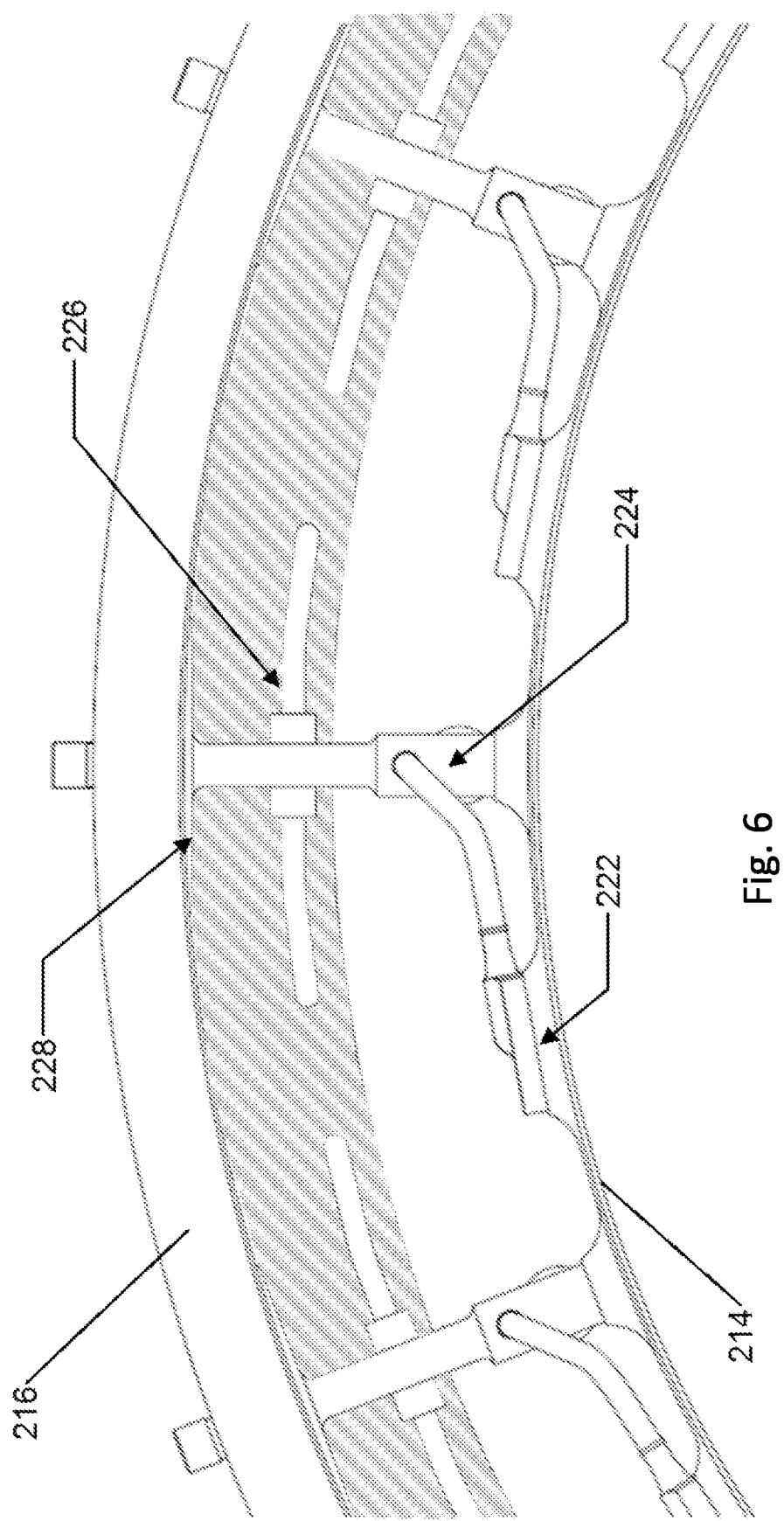
FIG. 6 schematically shows a cross-sectional view of the afterburner arrangement shown in FIG. 5.

FIG. 6 schematically shows a view of a cross-sectional view of the afterburner arrangement 200 shown in FIG. 5. The example afterburner arrangement 200 comprises a mounting strut 228 that (at least partly) houses fuel pathways for a first fuel nozzle 222, a second fuel nozzle 224 and a third fuel nozzle 226, although in other examples there may be fewer (for example one) or more nozzles and fuel pathways.

A comparison of FIG. 6 with FIG. 3 shows that the mounting strut 228 presents less of an obstacle to the airflow in the bypass pathway 218 compared to the mounting strut 120 and flow lines 130, 140 in the above described afterburner arrangement 112. This is partly because the mounting strut 228 is circumferentially aligned with the second fuel nozzle 224 and the third fuel nozzle 226. This is enabled by the mounting strut 228 partly housing fuel pathways for the at least the first, and also the second and third fuel nozzles. The obstruction is also at least partly reduced by virtue of there being no manifold within the bypass flow. The obstruction is also at least partly reduced because the fuel pathway extending from the strut to the first fuel nozzle 222 at the internal casing departs from the strut at a location proximal to the internal casing (whereas a comparable flow line in the example described above would extend fully from the external casing to the internal casing).

In previously considered afterburner arrangements, the crowding of the flanges of the flanged connectors for each of the first, second and third fuel feed lines, and the flange of the mounting strut itself, on the exterior surface of the external casing would not permit circumferential alignment of the mounting strut with the second and third fuel nozzles. By incorporating the fuel feed lines into the mounting strut, fewer flanged connectors are necessary, which gives a larger degree of design freedom in the circumferential placement of the mounting strut. It also means that there is a lower axial space claim on the external casing to provide for the structural connection to the internal casing, and the provision of fuel flow pathways to the various nozzles.

Figure 7:
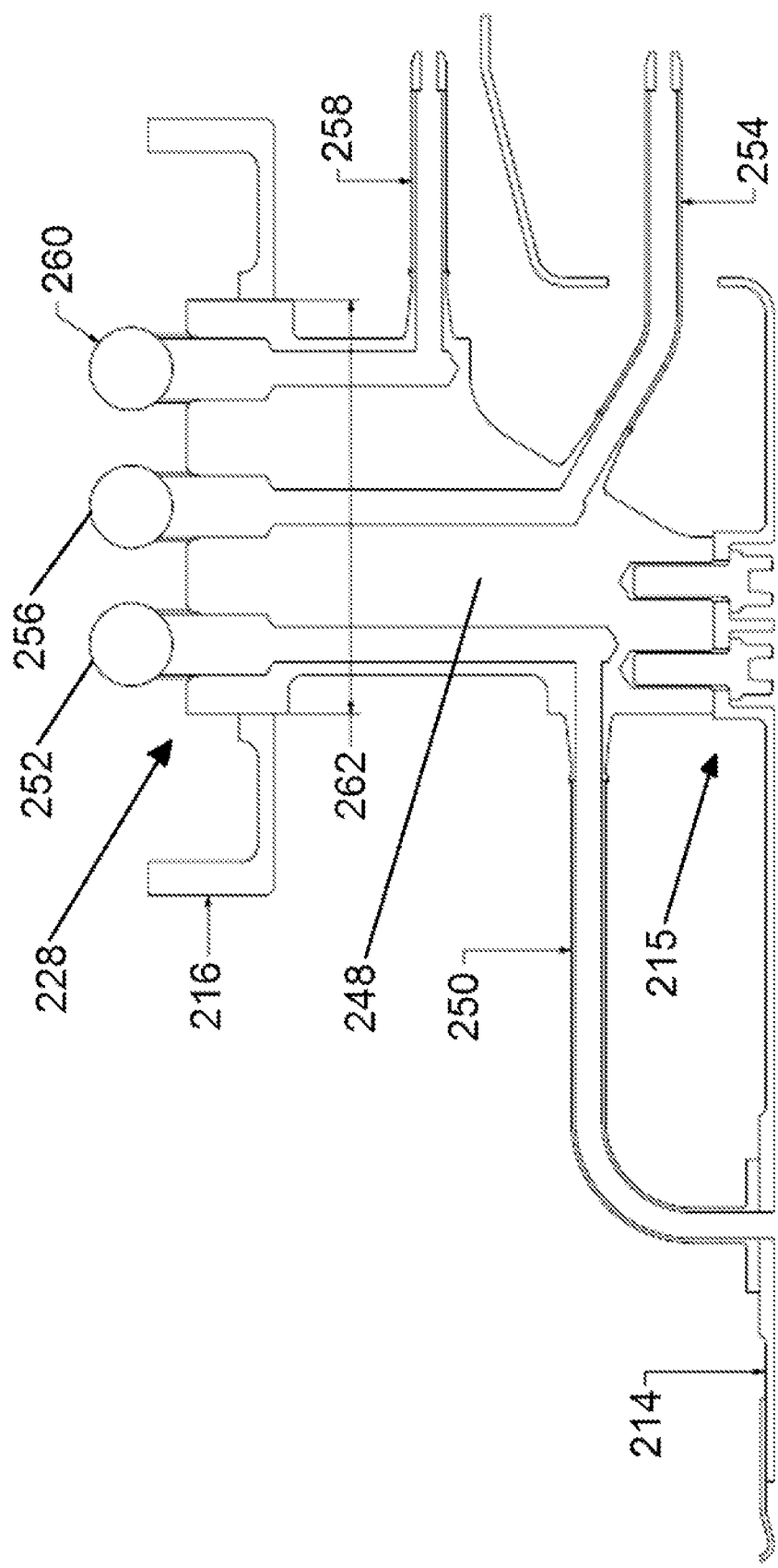
FIG. 7 schematically shows a detailed view of the afterburner arrangement shown in FIG. 5.

FIG. 7 schematically shows a detailed view of the example afterburner arrangement 200 shown in FIG. 5, and like reference numerals are retained as appropriate. The afterburner arrangement 200 comprises an internal casing 214 and an external casing 216 forming a bypass pathway 218 therebetween as described above. The bypass pathway 218 has a first, upstream end (the left side in FIG. 7) and a second, downstream end opposing the first end (the right side in FIG. 7). A mounting strut 228 is fixedly attached to the internal casing 214 at a structural attachment point 215 and has an outer end which is received in a hole in the external casing 216. In this example, the outer end is configured to slide with respect to the hole.

The mounting strut 228 partly houses a first fuel pathway 250. The first fuel pathway 250 runs from a first end on an outer surface of the external casing 216, through the mounting strut 228, to a second end comprising a flanged connection with the internal casing 214 which is spaced apart from the structural attachment point 215. The first end of the first fuel pathway 250 is configured to receive fuel from a first manifold 252, which extends circumferentially around the outer surface of the external casing 216. Part of the first fuel pathway 250 is defined by a fuel feed line that extends from a side of the mounting strut 228 (in this example, a side facing the upstream end of the bypass pathway) to the second end of the first fuel pathway 250 where it interfaces with the internal casing. The fuel feed line departs from a portion of the strut which is proximal to the internal casing, for example in the inner half of the strut, the inner third or the inner quarter of the strut. This may minimise obstruction of the bypass flow. Whilst the fuel feed line attached to the internal casing at a position spaced apart from the structural attachment point, stress on the fuel line in response to relative movement between the internal and external casing may be reduced as compared to an arrangement as described above with respect to FIGS. 2-4 in which there is a separate strut and feed line, since there is a single attachment point at the external casing, and the spaced-apart attachment points at the internal casing would be at similar temperature to each other and close together, such that there would be minimal relative movement between them owing to thermal expansion.

In the embodiment shown the fuel feed line is a separate component from the strut that is welded to the side of the mounting strut 228. However, in other embodiments the fuel feed line may be integrally formed with the mounting strut 228, or with a portion of a feed line extending within the strut, or it may be detachably attached to the strut or a fuel pathway within the strut. The second end of the first fuel pathway 250 is aligned with a hole in the internal casing 214, and the first fuel pathway 250 is configured to supply fuel to the first fuel nozzle 222 through this hole.

The mounting strut 228 partly houses a second fuel pathway 254. The second fuel pathway 254 runs from a first end on an outer surface of the external casing 216, through the mounting strut 228, out of a side of the mounting strut 228 facing the downstream end of the bypass pathway 218 to a second end comprising the second fuel nozzle 224. The first end of the second fuel pathway 254 is configured to receive fuel from a second manifold 256, which extends circumferentially around the outer surface of the external casing 216. The second fuel nozzle projects through a hole in the internal casing 214, and in this example, there is no coupling between the second fuel pathway 254 and the internal casing in the vicinity of the hole. In the embodiment shown, the second fuel nozzle 224 is a separate component that is welded to the side of the mounting strut 228. However, in other embodiments the second fuel nozzle 224 may be integrally formed with the mounting strut 228, or with a portion of a feed line extending within the strut.

The mounting strut 228 partly houses a third fuel pathway 258. The third fuel pathway 258 runs from a first end on an outer surface of the external casing 216, through the mounting strut 228, to a second end comprising the third fuel nozzle 226. The first end of the third fuel pathway 258 is configured to receive fuel from a third manifold 260, which extends circumferentially around the outer surface of the external casing 216. In the embodiment shown the third fuel nozzle 226 is a separate component that is welded to the side of the mounting strut 228. However, in other embodiments the third fuel nozzle 226 may be integrally formed with the mounting strut 228.

As shown, each of the fuel pathways 250 254, 258 extend through the outer end of the mounting strut 228 which is configured to form a structural connection with the external casing, such that there are no fuel line connections in the external casing which are not associated with the mounting strut 228. This both reduces the space claim for the structural and fuel connections at the external casing, and reduces the number of independent connections between the internal and external casing (i.e. locally reducing the number of such connections to one) so as to avoid imparting stress into such connections and the casings when the internal casing thermally expands relative to the external casing.

Figure 8:
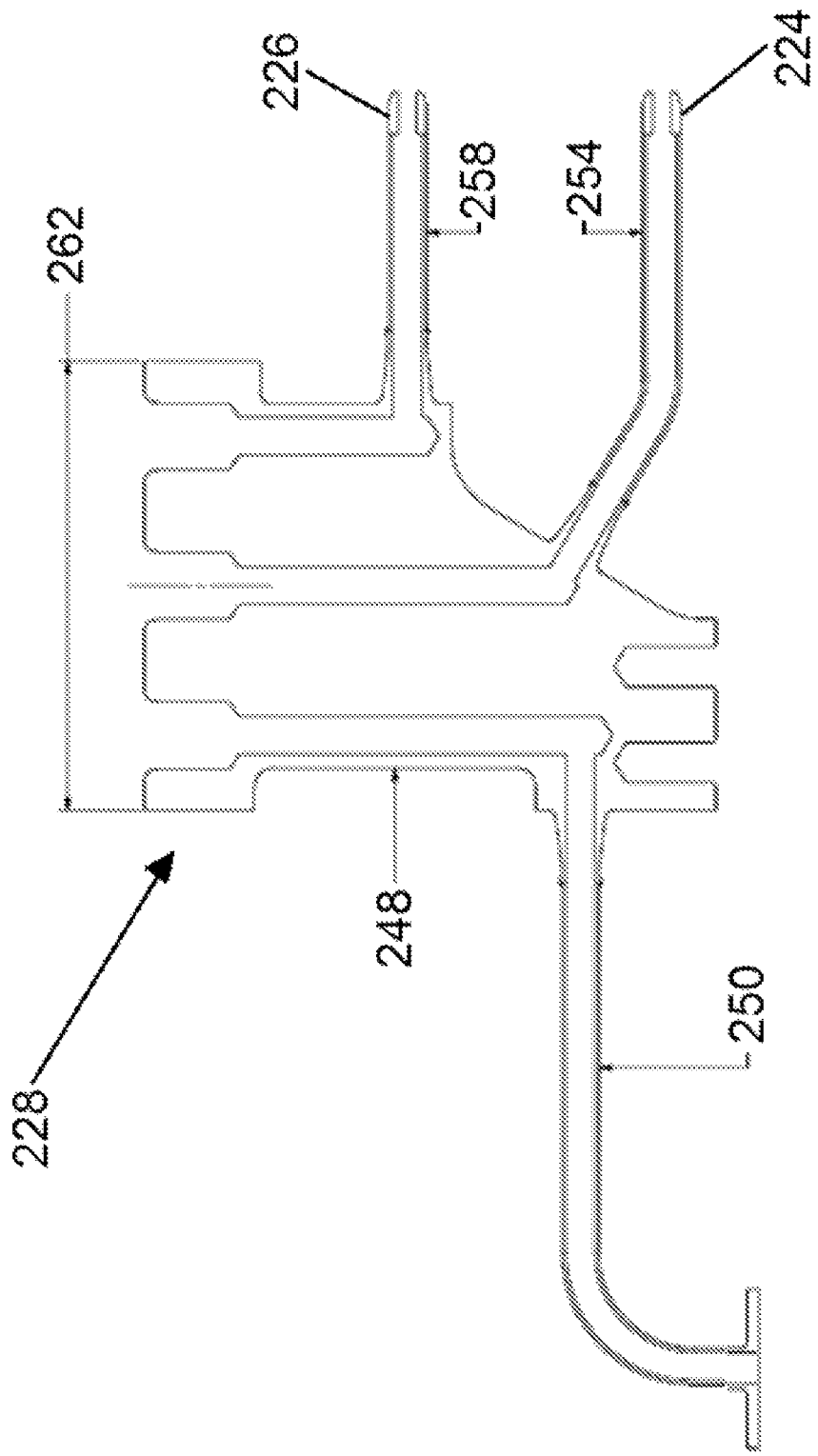
FIG. 8 schematically shows a view of a mounting strut for use in the present disclosure.

FIG. 8 schematically shows a view of a mounting strut 228 for use in the present disclosure. It can be seen that mounting strut 228 comprises a distribution block 248, i.e. a block of material at least partly forming the strut, with boreholes drilled into the block to provide first, second and third fuel pathways through the block. In this example, the distribution block 248 shown in FIG. 8 has had three vertical boreholes drilled into it from above to form the respective first ends of the first, second and third fuel pathways 250, 254, 258.

A substantially horizontal borehole (i.e. parallel with the engine centreline) has been drilled into a first side of the distribution block 248 (i.e. the side of the distribution block 248 facing the upstream end of the bypass pathway in use) to provide an exit for the first fuel pathway 250 from the first side of the distribution block 248.

A further horizontal borehole has been drilled into a second side of the distribution block 248 (i.e. the side of the distribution block 248 facing the downstream end of the bypass pathway in use) to provide an exit for the third fuel pathway 258 from the second side of the distribution block 248.

A borehole angled at approximately 45° has been drilled into the second side of the distribution block 248 to provide an exit for the second fuel pathway 254.

As shown, a fuel feed line has been welded to the distribution block 248 at the point at which the first fuel pathway 250 exits the first side of the distribution block 248. The second fuel nozzle 224 has been welded to the distribution block 248 at the point at which the second fuel pathway 254 exits the distribution block 248. The third fuel nozzle 226 has been welded to the distribution block 248 at the point at which the third fuel pathway exits the distribution block 248. However, some or all of these components could be formed integrally with the distribution block 248. The distribution block 248 could be formed by any suitable manufacturing process, e.g. casting, moulding, 3D printing, additive manufacture, etc.

Figure 9:
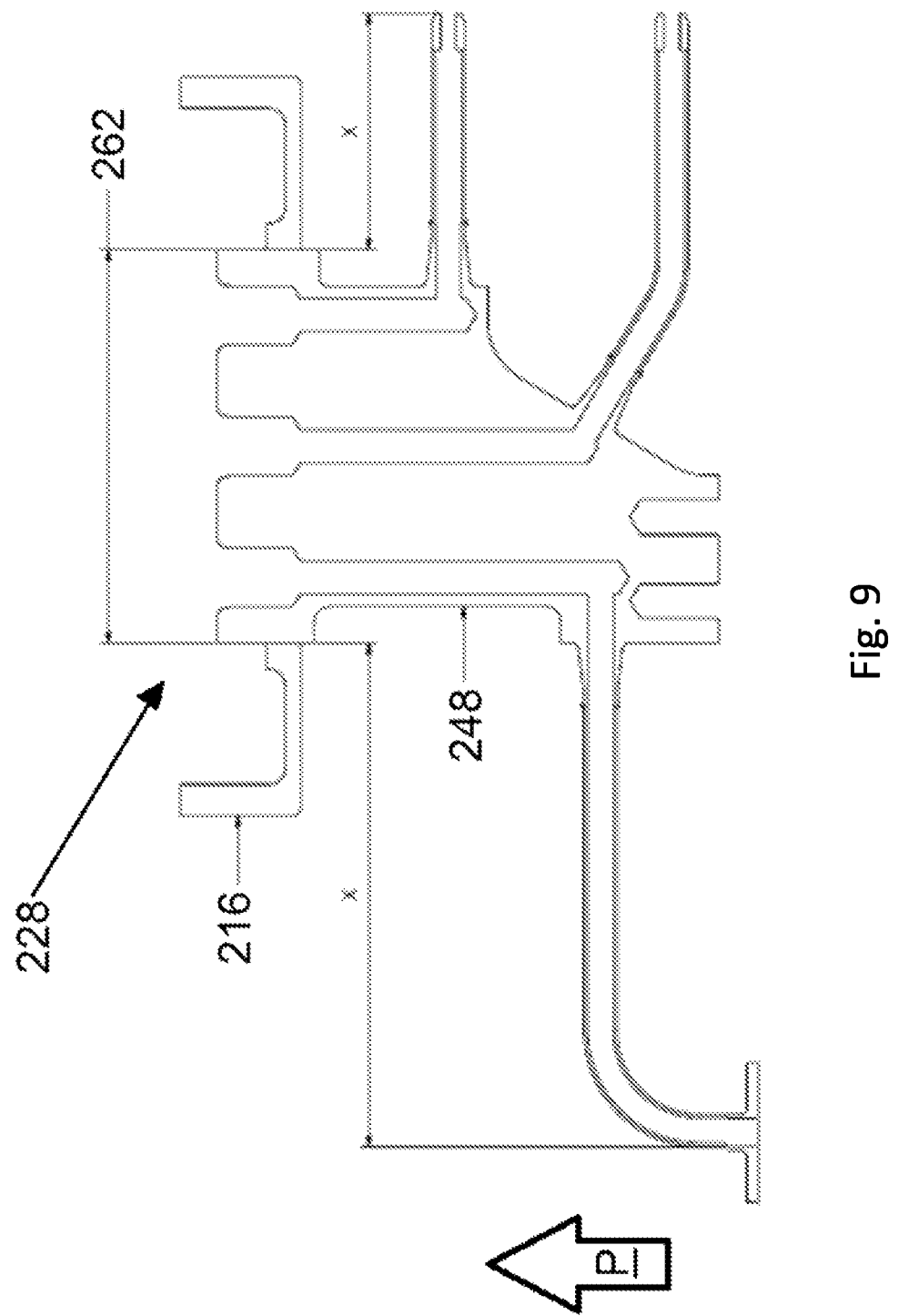
FIGS. 9 to 11 schematically show stages of a method of assembling an afterburner arrangement according to an embodiment of the disclosure.
Figure 10:
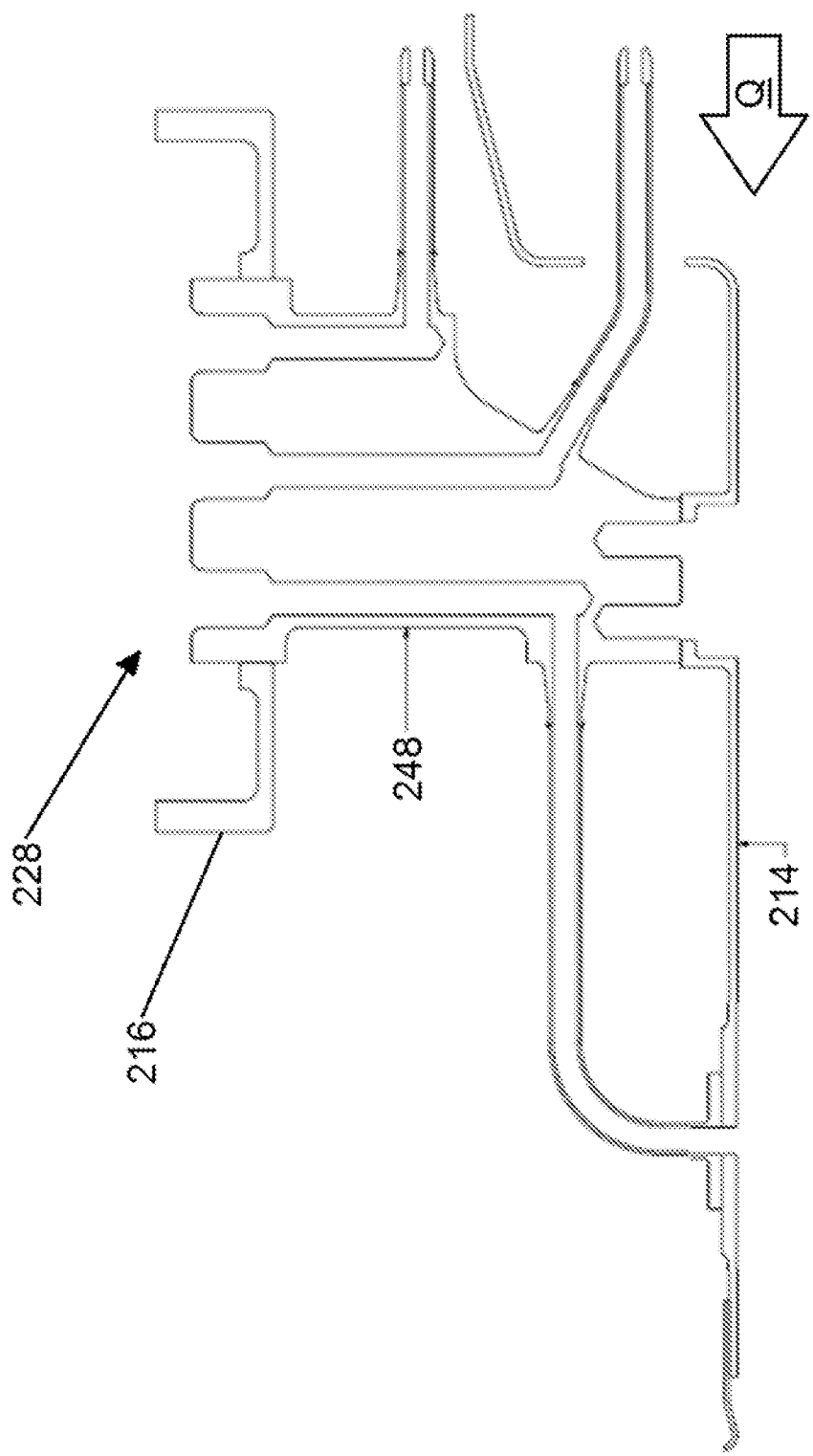
Figure 11:
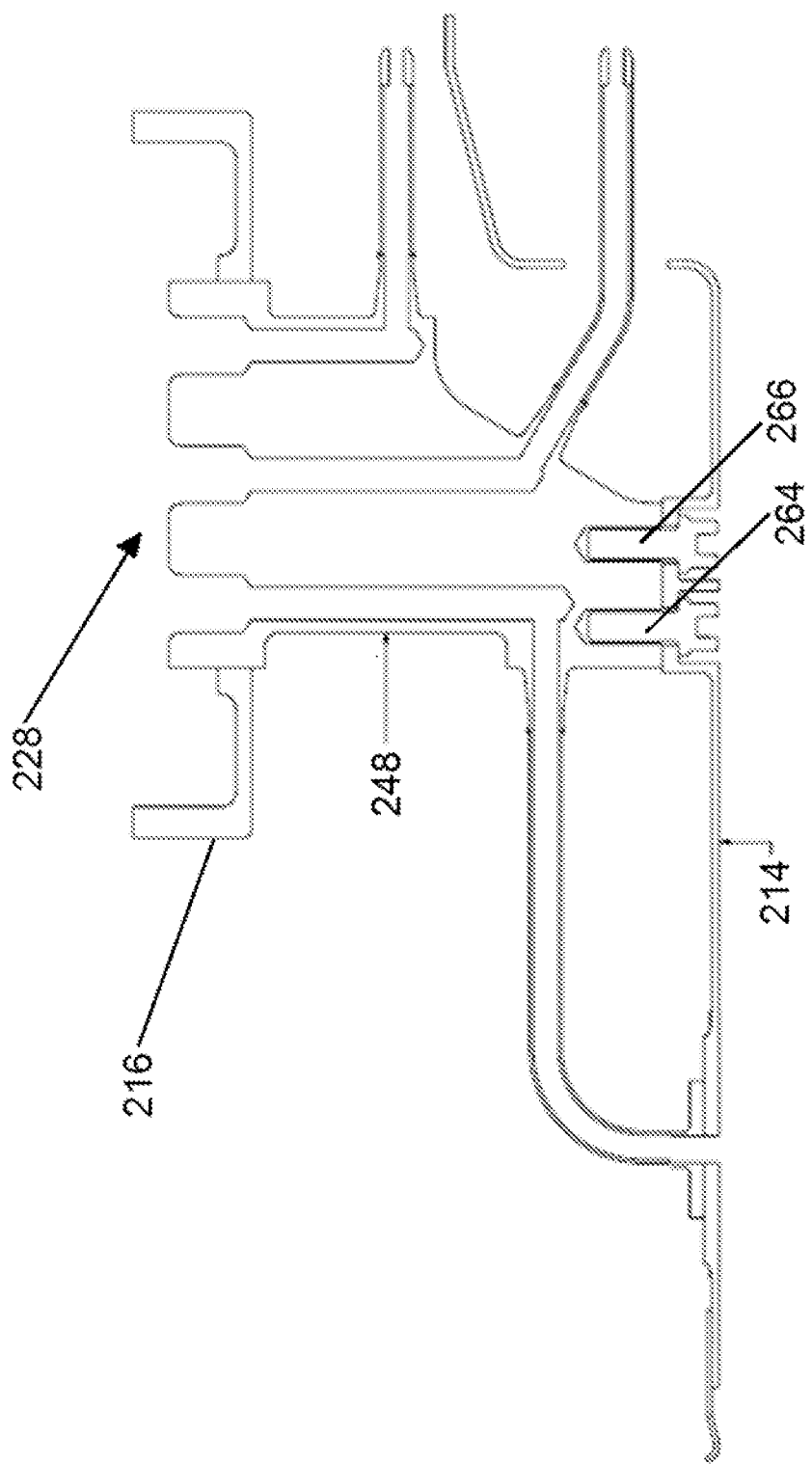

FIGS. 9-11 schematically show stages of a method of assembling an afterburner arrangement according to an embodiment of the disclosure.

In FIG. 9 a mounting strut 228 as described above with respect to FIG. 8 has been inserted through a hole in the external casing 216 in the direction of arrow P. The mounting strut 228 interacts with the external casing 216 via a sliding interface 262. In FIG. 9 it can be seen that installing the mounting strut 228 in the external casing 16 from the inner surface (i.e. the surface that will face the bypass pathway when the afterburner arrangement is fully assembled) allows the mounting strut 228 to comprise parts that project upstream or downstream of the hole in the external casing (see dimensions labelled x in FIG. 9). This was not possible in previously considered assembly techniques in which the mounting strut was installed from an outer surface of the external casing 216.

In FIG. 10 an internal casing 214 has been inserted in the external casing 216 in the direction of arrow Q. As can be seen, the internal casing 214 has been inserted until a hole in the internal casing 214 aligns with the second end of the first fuel pathway through the mounting strut 228. In this position, a mounting point in the internal casing 214 aligns with an attachment point of the mounting strut 228. In other examples there may be no separate mounting of a fuel pathway to the internal casing, and the alignment may only be at the structural attachment point of the internal casing.

In FIG. 11 the mounting point of the internal casing 214 has been attached to the attachment point of the mounting strut 228 by inserting fasteners 264, 266 through the attachment point of the internal casing 214 and into the mounting point of the mounting strut 228. In the embodiment shown the fasteners 264, 266 are removable so that the afterburner assembly can be disassembled if required. However, in some embodiments the internal casing 214 may be permanently affixed to the mounting strut 228, e.g. by welding the two components together. While in the embodiment shown the mounting strut 228 is attached to the internal casing 214 on the part facing the external casing 216, it could be attached to the internal casing 214 at any point, e.g. the axially rearward part of the internal casing 214 that is substantially perpendicular to the external casing 216.

While specific embodiments of the disclosure have been described above for the purposes of illustration it will be appreciated that the disclosure is not so limited, and various alternatives and modifications will be apparent to a person skilled in the art without departing from the scope of the disclosure.

For example, while in FIGS. 9-11 the internal casing 214 is inserted into the external casing 216 in a single direction as one piece, the internal casing 214 could alternatively comprise two parts inserted from opposite directions and subsequently joined together.

As a further example, while all of the nozzles in the embodiments discussed above are used to spray fuel, one or more of the nozzles could alternatively be used to spray air or coolant (e.g. for the purposes of cooling afterburner components to increase their usable lifespan).

What is claimed is:

1. An afterburner arrangement comprising:
    an internal casing and an external casing defining a bypass pathway between them;
    a mounting strut forming a structural connection between the internal casing and the external casing; and
    a plurality of fuel nozzles associated with the mounting strut, wherein the mounting strut at least partly houses a corresponding plurality of fuel pathways to provide fuel to the respective fuel nozzles,
    wherein a fuel pathway of the plurality of fuel pathways extends through the internal casing to a respective fuel nozzle attached to the internal casing configured to discharge fuel radially inward of the internal casing, and
    wherein a fuel nozzle of the plurality of fuel nozzles is fixedly attached to the mounting strut at a location radially between the internal casing and external casing.

2. The afterburner arrangement according to claim 1, wherein the fuel nozzle of the plurality of fuel nozzles attached to the internal casing is attached at a location spaced apart from a structural attachment point between the mounting strut and the internal casing; and
    wherein the afterburner arrangement further comprises a fuel feed line at least partly defining the respective fuel pathway and extending between the mounting strut and the fuel nozzle attached to the internal casing.

3. The afterburner arrangement according to claim 1, wherein the mounting strut is fixedly attached to the internal casing.

4. The afterburner arrangement according to claim 1, wherein
    the external casing comprises an inner surface exposed to the bypass pathway and an outer surface opposed to the inner surface, and the mounting strut extends through a hole in the external casing, and between the inner surface to the outer surface.

5. The afterburner arrangement according to claim 4, wherein the mounting strut and the hole in the external casing are configured so that the mounting strut can only be received in the hole from an inner side of the external casing.

6. The afterburner arrangement according to claim 4, wherein the bypass pathway has a first, upstream end and a second, downstream end opposite the upstream end, and wherein a portion of the mounting strut which at least partly houses the fuel pathway extends upstream or downstream of the hole in the external casing such that the portion of the mounting strut has a cross-section larger than a cross-section of the hole in the external casing.

7. The afterburner arrangement according to claim 1, wherein a fuel pathway of the plurality of fuel pathways is configured to convey fuel from a position radially outward of a junction between the external casing and the mounting strut, through a portion of the mounting strut and out of the mounting strut within the bypass pathway.

8. The afterburner arrangement according to claim 1, wherein the mounting strut comprises a distribution block, wherein there are at least two fuel pathways each comprising a borehole in the distribution block.

9. The afterburner arrangement according to claim 1, wherein the mounting strut is one of a plurality of mounting struts circumferentially distributed around the afterburner arrangement, each having one or more associated fuel nozzles and fuel pathways at least partly housed in the respective strut.

10. The afterburner arrangement according to claim 9, wherein the afterburner arrangement further comprises a manifold configured to provide fuel to at least some of the fuel pathways associated with different mounting struts, wherein the manifold is disposed radially outside of the bypass pathway and each one of the respective fuel pathways is configured to convey the fuel through a wall of the external casing defining the bypass pathway.

11. A gas turbine engine comprising an afterburner arrangement according to claim 1.

12. A method of assembling an afterburner arrangement, the method comprising:
  providing an external casing defining an outer surface of a bypass pathway, the external casing having a mounting hole;
  inserting a mounting strut into the mounting hole from an inner side of the external casing, said mounting strut at least partly housing a fuel pathway to provide fuel to a fuel nozzle;
  subsequently receiving an internal casing defining an inner surface of the bypass pathway radially within the external casing to align a mounting point of the internal casing with a corresponding mounting point of the mounting strut; and
  attaching the mounting point of the mounting strut to the mounting point of the internal casing,
  wherein the mounting strut at least partly houses a plurality of fuel pathways to provide fuel to a corresponding plurality of fuel nozzles,
  wherein a fuel pathway of the plurality of fuel pathways extends through the internal casing to a respective fuel nozzle attached to the internal casing configured to discharge fuel radially inward of the internal casing, and
  wherein a fuel nozzle of the plurality of fuel nozzles is fixedly attached to the mounting strut at a location radially between the internal casing and external casing.

* * * * *